UNITED STATES PATENT OFFICE.

JACOB GEORG HIRSCH, OF HALBERSTADT, GERMANY, ASSIGNOR TO CHEMISCHE FABRIK VON HEYDEN, AKTIENGESELLSCHAFT, OF RADEBEUL, NEAR DRESDEN, GERMANY.

SOLUTION OF MERCUROUS OXYCYANID AND DIANISYL-MONOPHENETIDYL-GUANIDINCHLORHYDRATE.

No. 846,849.  Specification of Letters Patent.  Patented March 12, 1907.

Application filed August 10, 1906. Serial No. 329,957.

*To all whom it may concern:*

Be it known that I, JACOB GEORG HIRSCH, a subject of the King of Prussia, and a resident of Lindenmeg 38, at Halberstadt, Kingdom of Prussia, German Empire, have invented a new and useful Improvement in a Clear Solution of Mercurous Oxycyanid and Dianisyl - Monophenetidyl - Guanidinchlorhydrate, of which the following is a specification.

In therapy subcutaneous injections of concentrated—about one per cent.—aqueous solutions of mercurous oxycyanid (= hydrargyrum oxycyanatum, $HgO.Hg(CN)_2$) are employed as a cure for syphilis. These injections are, like all other of that kind, more or less painful. I have tried to remove the painfulness by an addition of dianisyl-monophenetidyl-guanidinchlorhydrate, an anesthetic.

A solution of mercurous oxycyanid can be mixed with a solution of dianisyl-monophenetidyl-guanidinchlorhydrate if both solutions are very diluted ones—*i. e.*, 1:1000 of more. In a one-per-cent. solution of mercurous oxycyanid, however, dianisyl-monophenetidyl-guanidinchlorhydrate forms at once a precipitate, so that the mixture cannot be used.

I have discovered the following fact: If about five drops of an acid—for example, hydrochloric or nitric acid—are added to one hundred grams of a concentrated solution of mercurous oxycyanid, this solution remains clear and gives no precipitate when mixed with a one-per-cent. aqueous solution of dianisyl - monophenetidyl - guanidinchlorhydrate.

For antisyphilitic subcutaneous injections I thus prepare, for instance, a mixture of three parts of a one and two-thirds per cent. solution of mercurous oxycyanid with two parts of a one-per-cent. solution of dyanisyl-monophenetydil - guanidicinchlorhydrate. This injection causes no pain.

What I claim is—

An aqueous solution of 0.5 up to 1.5 per cent. of mercurous oxycyanid and 0.3 up to 1.0 per cent. dianisyl-monophenetidyl-guanidinchlorhydrate containing such a small quantity of an acid as is sufficient to secure a clear state of the solution, substantially as described.

In testimony that I claim the foregoing as my invention I have signed my name, in presence of two witnesses, this 27th day of July, 1906.

JACOB GEORG HIRSCH.

Witnesses:
 ERNST THIEMS,
 ARTUR HIRSCH.